US009955472B2

(12) United States Patent
Furuskog et al.

(10) Patent No.: US 9,955,472 B2
(45) Date of Patent: *Apr. 24, 2018

(54) METHODS REDUCING ANTENNA PORT INTERFERENCE FOR EPDCCH AND RELATED SYSTEMS, DEVICES, AND NETWORKS

(71) Applicant: Telefonaktiebolaget LM Ericsson (publ), Stockholm (SE)

(72) Inventors: Johan Furuskog, Stockholm (SE); Mattias Frenne, Uppsala (SE); Daniel Larsson, Vallentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,665

(22) Filed: Oct. 20, 2016

(65) Prior Publication Data

US 2017/0041172 A1   Feb. 9, 2017

Related U.S. Application Data

(63) Continuation of application No. 14/429,417, filed as application No. PCT/SE2013/051114 on Sep. 25, 2013, now Pat. No. 9,503,140.

(Continued)

(51) Int. Cl.
*H04W 72/04* (2009.01)
*H04W 84/04* (2009.01)
(Continued)

(52) U.S. Cl.
CPC .......... *H04W 72/042* (2013.01); *H04B 1/123* (2013.01); *H04L 5/0023* (2013.01);
(Continued)

(58) Field of Classification Search
CPC . H04B 1/123; H04B 1/12; H04B 1/10; H04B 7/028; H04J 11/00–11/0093; H04L 5/0023; H04L 5/0025; H04L 5/0048–5/0053; H04L 5/0091–5/0098; H04L 2025/03783–2025/03796; H04W 72/042; H04W 72/0406; H04W 72/005;
(Continued)

(56) References Cited

U.S. PATENT DOCUMENTS

| | | | | |
|---|---|---|---|---|
| 9,503,140 B2 * | 11/2016 | Furuskog | .............. | H04L 5/0023 370/329 |
| 2013/0039284 A1 * | 2/2013 | Marinier | ................. | H04L 5/001 370/329 |

OTHER PUBLICATIONS

International Search Report, International Application No. PCT/SE2013/051114 dated Dec. 13, 2013, 4 pages.

(Continued)

*Primary Examiner* — Timothy J Weidner
(74) *Attorney, Agent, or Firm* — Sage Patent Group

(57) ABSTRACT

A method of operating a base station in a radio access network may include configuring first and second control channel sets with respective first and second antenna port configurations for a wireless terminal using control channel signaling transmitted to the wireless terminal. First reference signals may be transmitted to the wireless terminal according to the first antenna port configuration, and second reference signals may be transmitted to the wireless terminal according to the second antenna port configuration.

18 Claims, 10 Drawing Sheets

Related U.S. Application Data

(60) Provisional application No. 61/707,558, filed on Sep. 28, 2012.

(51) Int. Cl.
    *H04L 27/26* (2006.01)
    *H04L 5/06* (2006.01)
    *H04B 1/12* (2006.01)
    *H04L 5/00* (2006.01)

(52) U.S. Cl.
    CPC .......... *H04L 5/0048* (2013.01); *H04L 5/0051* (2013.01); *H04L 5/0053* (2013.01); *H04L 27/2613* (2013.01); *H04W 84/042* (2013.01)

(58) Field of Classification Search
    CPC ............... H04W 72/044–72/0473; H04W 72/1278–72/1294; H04W 72/00–72/14; H04W 74/006
    See application file for complete search history.

(56) References Cited

OTHER PUBLICATIONS

Written Opinion of the International Searching Authority, International Application No. PCT/SE2013/051114 dated Dec. 13, 2013, 8 pages.

Renesas Mobile Europe LTD: "Search space design for ePDCCH", 3GPP Draft; R1-123586, 3rd Generation Partnership Project (3GPP), Mobile Competence Centre; 650 Route Des Lucioles; F-06921 Sophia-Antipolis Cedex; France, vol. RAN WG1, No. Qingdao, China; Aug. 5, 2012, XP050661464, Retrieved from the Internet: URL;http://www.3gpp.org/ftp/tsg_ran/WG1_RL1/TSGR1_70/Docs/.

Huawei et al: "Antenna port association for ePDCCH", 3GPP Draft; R1-123560, 3rd Generation Partnership Project (3GPP), Mobile Competence Centre; 650 Route Des Lucioles; F-06921 Sophia-Antipolis Cedex; France, vol. RAN WG1, No. Qingdao, China; Aug. 5, 2012, XP050661438, Retrieved from the Internet: URL;http://www.3gpp.org/ftp/tsg_ran/WG1_RL1/TSGR1_70/Docs/.

Ericsson et al: "Remaining details on antenna ports", 3GPP Draft; R1-123617, 3rd Generation Partnership Project (3GPP), Mobile Competence Centre; 650 Route Des Lucioles; F-06921 Sophia-Antipolis Cedex; France, vol. RAN WG1, No. Qingdao, China; Aug. 5, 2012, XP050661493, Retrieved from the Internet: URL;http://www.3gpp.org/ftp/tsg_ran/WG1_RL1/TSGR1_70/Docs/.

Ericsson et al: "Search Space Aspects for ePDCCH", 3GPP Draft; R1-123616, 3rd Generation Partnership Project (3GPP), Mobile Competence Centre; 650 Route Des Lucioles; F-06921 Sophia-Antipolis Cedex; France, vol. RAN WG1, No. Qingdao, China; Aug. 5, 2012, XP050661492, Retrieved from the Internet: URL;http://www.3gpp.org/ftp/tsg_ran/WG1_RL1/TSGR1_70/Docs/.

Ericsson et al: "ePDCCH antenna port configuration", 3GPP Draft; R1-124154, 3rd Generation Partnership Project (3GPP), Mobile Competence Centre; 650 Route Des Lucioles; F-06921 Sophia-Antipolis Cedex; France, vol. RAN WG1, No. San Diego, USA; Sep. 29, 2012, XP050662063, Retrieved from the Internet: URL;http://www.3gpp.org/ftp/tsg_ran/WG1_RL1/TSGR1_70b/Docs/.

3GPP, Technical Specification, "3rd Generation Partnership Project; Technical Specification Group Radio Access Network; Evolved Universal Terrestrial Radio Access (E-UTRA); Physical Channels and Modulation (Release 11)", 3GPP TS 36.211 V 11.0.0 (Sep. 2012), 106 pp.

\* cited by examiner

1 EPDCCH = 4 parts

Subframe

Enhanced control regions subcarriers

OFDM symbols eREG 0 eREG 15

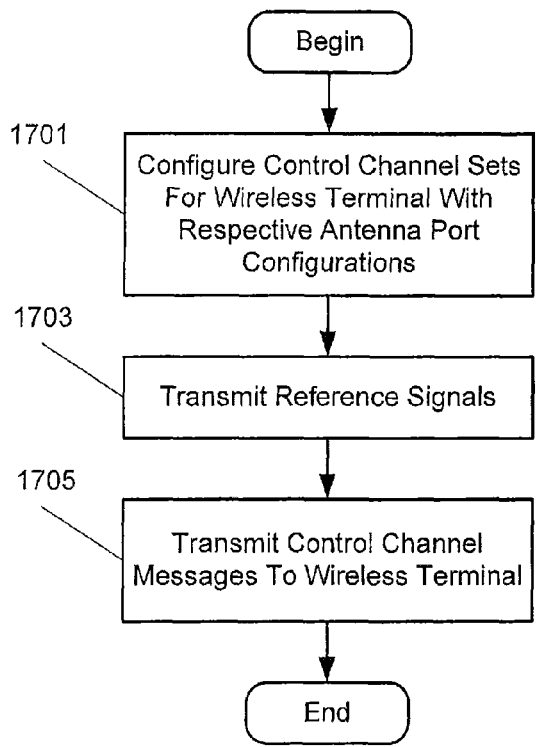
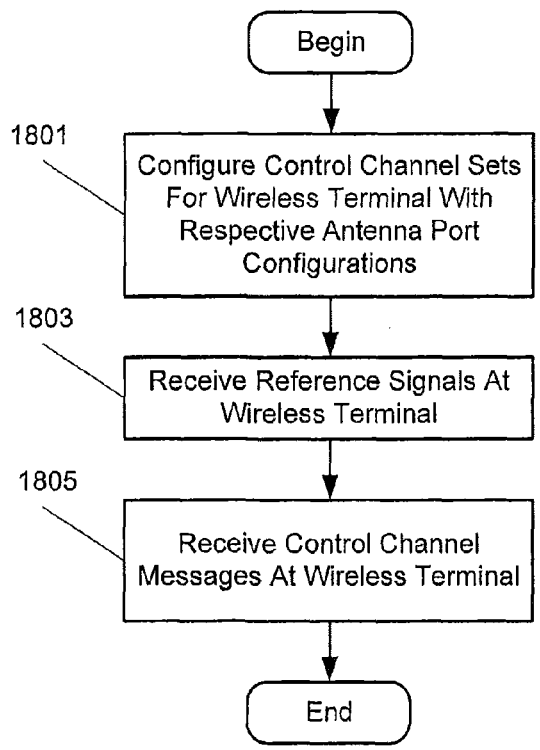

METHODS REDUCING ANTENNA PORT INTERFERENCE FOR EPDCCH AND RELATED SYSTEMS, DEVICES, AND NETWORKS

CROSS-REFERENCE TO RELATED APPLICATIONS

This application is a continuation of U.S. patent application Ser. No. 14/429,417, filed Mar. 19, 2015, which itself is a 35 U.S.C. § 371 national stage application of PCT International Application No. PCT/SE2013/051114, filed on Sep. 25, 2013, which itself claims the benefit of priority from U.S. Provisional Application No. 51/707,558 filed Sep. 28, 2012, the disclosure of all of which are hereby incorporated herein in their entireties by reference. The above-referenced PCT International Application was published in the English language as International Publication No. WO 2014/051506 A1 on Apr. 3, 2014.

FIELD OF THE INVENTION

The present disclosure is directed to antenna port configurations for control channel sets in wireless communications and related methods, base stations, and wireless terminals. For example, embodiments discussed herein may relate to L1 control signaling, EPDCCH (Enhanced Physical Downlink Control CHannel), COMP (Coordinated Multi Point), and/or Heterogeneous networks.

BACKGROUND

In LTE Rel-11 (Long Term Evolution, Release 11) a new enhanced downlink control channel has been introduced, the EPDCCH (Enhanced Physical Downlink Control CHannel). The EPDCCH may be used for heterogeneous network operation, where a UE (also referred to as a wireless terminal or user equipment node) with a large cell selection bias is connected to a lower power node (e.g., a pico base station), and high interference from a nearby high power node (e.g., a macro base station) can be reduced/avoided by frequency domain intercell interference coordination (f-ICIC) where the high power node avoids transmitting (or transmits with reduced power) the shared data channel in those resources (i.e., PRB or Physical Resource Block pairs) used by EPDCCH transmissions in the lower power node.

3GPP (3rd Generation Partnership Project) Long Term Evolution (LTE) technology is a mobile broadband wireless communication technology in which transmissions from base stations (referred to as eNBs or enhanced nodeBs) to mobile stations (referred to as user equipment (UE) or wireless terminals) are sent using orthogonal frequency division multiplexing (OFDM). OFDM splits the signal into multiple parallel sub-carriers in frequency. The basic unit of transmission in LTE is a resource block (RB), which in its most common configuration includes 12 subcarriers and 7 OFDM symbols (one slot). A unit of one subcarrier and 1 OFDM symbol is referred to as a resource element (RE) as shown in FIG. 1.

Thus, an RB (resource block) may consist of 84 REs (i.e., with 7 OFDM symbols for each of 12 subcarriers). An LTE radio subframe may consist of multiple resource blocks in frequency, with the number of RBs determining the bandwidth of the system and two slots in time as shown in FIG. 2.

Furthermore, the two RBs in a subframe that are adjacent in time may be referred to as an RB pair (resource block pair).

In the time domain, LTE downlink transmissions may be organized into radio frames of 10 ms (milliseconds), with each radio frame consisting of ten equally-sized subframes of length Tsubframe=1 ms (millisecond).

The signal transmitted by the eNB (base station or macro base station) in a downlink (the link carrying transmissions from the eNB to the UE) subframe may be transmitted from multiple antennas and the signal may be received at a UE that has multiple antennas. The radio channel may distort the transmitted signals from the multiple antenna ports. To demodulate any transmissions on the downlink, a UE may rely on reference symbols (RS) that are transmitted on the downlink. These reference symbols and their position(s) in the time-frequency grid are known to the UE and hence can be used to determine channel estimates by measuring the effect of the radio channel on these symbols.

Enhanced Control Signaling in LTE

Messages transmitted over the radio link to UEs or wireless terminals can be broadly classified as control messages or data messages. Control messages are used to facilitate the proper operation of the system as well as proper operation of each UE within the system. Control messages may include commands to control functions such as the transmitted power from a UE, signaling of RBs within which data is to be received by the UE and/or transmitted from the UE, etc.

In Rel-8 (Release 8), the first one to four OFDM symbols, depending on the configuration, in a subframe are reserved to provide such control information, as shown above in FIG. 2. Furthermore, in Rel-11 (Release 11), an enhanced control channel was introduced (EPDCCH), in which PRB (Physical Resource Block) pairs are reserved to exclusively contain EPDCCH transmissions, although excluding from the PRB pair the one to four first symbols that may contain control information to UEs of releases earlier than Rel-11, as shown in FIG. 3.

FIG. 3 illustrates a downlink subframe showing 10 RB pairs and configuration of three EPDCCH regions (i.e., bottom, middle, and upper more darkly shaded regions) of size 1 PBR pair each. The remaining PRB pairs can be used for PDSCH transmissions.

Accordingly, the EPDCCH is frequency multiplexed with PDSCH (Physical Downlink Shared Channel) transmissions contrary to PDCCH (Physical Downlink Control CHannel) which is time multiplexed with PDSCH transmissions. Note also that multiplexing of PDSCH and any EPDCCH transmission within a PRB pair is not supported in LTE Rel-11.

Furthermore, two modes of EPDCCH transmission may be supported, localized EPDCCH transmission and distributed EPDCCH transmission. In distributed transmission, an EPDCCH is mapped to resource elements in up to D (also represented by the variable N) PRB pairs, where D=2,4, or 8 (the value of D=16 is also being considered in 3GPP). In this way frequency diversity can be achieved for the EPDCCH message as shown in FIG. 4.

In FIG. 4, a downlink subframe shows 4 parts, or enhanced resource element groups (eREG), belonging to an EPDCCH that is mapped to multiple of the enhanced control regions (known as PRB pairs) to provide distributed transmission and frequency diversity.

In localized transmission, an EPDCCH is mapped to one PRB pair only, if the space allows (which is always possible for aggregation level one and two and for normal subframes and normal CP or cyclic prefix length also for level four). If the aggregation level of the EPDCCH is too large, a second PRB pair may be used as well, and so on, using more PRB pairs, until all eCCEs (enhanced Control Channel Elements) belonging to the EPDCCH have been mapped. The number of eCCEs that fit into one PRB pair is given by FIG. 5 illustrating localized transmission.

In FIG. 5, a downlink subframe shows 4 eCCEs belonging to an EPDCCH mapped to one of the enhanced control regions, to achieve localized transmission.

To facilitate the mapping of eCCEs to physical resources, each PRB pair is divided into 16 enhanced resource element groups (eREGs) and each eCCE is split into L=4 or L=8 eREGs for normal and extended cyclic prefix, respectively. An EPDCCH is consequently mapped to a multiple of four or eight eREGs depending on the aggregation level.

The eREGs belonging to an EPDCCH reside in either a single PRB pair (as may be typical for localized transmission) or a multiple of PRB pairs (as may be typical for distributed transmission). An exact division of a PRB pair into eREGs has not yet been decided in 3GPP. One example of a division of a PRB pair into eREGs is illustrated in FIG. 6. Furthermore, it is not yet agreed in 3GPP how L=4 or L=8 eREGs respectively are grouped into the eCCEs. It is also an open question as to how the encoded and modulated symbols of an EPDCCH message are mapped to the REs within the resources reserved by its associated eREGs.

FIG. 6 illustrates a PRB pair of normal cyclic prefix configuration in a normal subframe. Each tile is a resource element where the number corresponds to the eREG it is grouped within. REs with lighter shading correspond to REs belonging to the same eREG indexed with 0.

Allocation of EPDCCH Resources

EPDCCH resources are UE specifically configured in terms of EPDCCH sets. An EPDCCH set is a collection of N (also represented by the variable D) PRB pairs containing 16N/L eCCE, where agreed possible values of N=2,4,8. A UE can be configured with K sets simultaneously, and the value N can be different for each of the K sets. A maximum possible value of K has yet to be determined in 3GPP, but a typical value is K=2. Each set is also configured to be of either a localized or distributed type. For example, a UE may be configured with K=2 and $N_1$=4 and $N_2$=8, where the first set is used for localized transmission and the second set is used for distributed transmission. The total number of blind decodes (32 in the case that uplink MIMO is not configured) is split between the K sets. How this split is done has not been decided yet in 3GPP, but one potential solution is to split them as equal as possible between the sets. Hence, a UE will monitor $B_i$ EPDCCH candidates in EPDCCH set i. An illustration for the case of K=3 sets with N=4 PRB pairs each is shown in FIG. 7.

FIG. 7 illustrates the definition of sets and clusters where the number of sets equals the RBG size. The number of RBGs per cluster is in this example is set to four which corresponds to four PRB pairs per set. A distributed EPDCCH transmission is mapped within one set.

Mapping of EPDCCH to RE

Each EPDCCH consists of AL (Aggregation Level) eCCEs where AL is the aggregation level of the message. Each eCCE in turn consists of L eREGs where L=4 or L=8. An eREG is a group of REs which will be defined in 3GPP specification TS 36.211. In each PRB pair, there are 16 eREGs. When EPDCCH collides in mapping with other signals (such as own cell CRS or own cell legacy control region), the other signals have priority, and EPDCCH is mapped around these occupied REs and code chain rate matching is applied. This means that an effective number of available RE per eREG is usually less than the 9 RE, but there may be no/little interference from these colliding signals introduced in the decoding since the EPDCCH is mapped around those.

DMRS for EPDCCH

It has been agreed in 3GPP RAN WG1 that each eCCE in a PRB pair of a localized EPDCCH set is associated with a DMRS (De-Modulation Reference Signal) antenna port (or AP) by specification, as shown by way of example in FIG. 8. Furthermore, it is agreed that in case an EPDCCH message occupies more than one eCCE of a PRB pair (i.e., for higher aggregation levels of localized EPDCCH messages), one of the associated ports is used for its demodulation. The port to use may be, for example, implicitly determined by RNTI (Radio-Network Temporary Identifier) or configured via RRC.

FIG. 8 illustrates an example of eCCE and DMRS port association for a PRB pair within a localized EPDCCH set.

For distributed transmission, it has been agreed that two DMRS ports are used to achieve spatial diversity, and an example is shown in FIG. 9. Each RE of the used eREG is in an alternating manner mapped to either of the two antenna ports to provide spatial diversity of the EPDCCH transmission.

FIG. 9 illustrates an example of an antenna port association for a PRB pair within a distributed EPDCCH set.

It is also agreed that the same scrambling sequence generator as is used for the PDSCH DMRS will be used for the EPDCCH DMRS. It is a working assumption that the generator is initialized by:

$$c_{init}=([n_s/2]+1)\cdot(2X+1)\cdot 2^{16}+n_{SCID},$$

where $n_s$ is the slot number in a radio frame. Values of X and $n_{SCID}$ are not yet decided. By initializing this generator in different ways, different pseudo-random sequences are obtained which is desirable from an interference perspective when the same DMRS port is transmitted on interfering radio resources (e.g., in neighboring cells). The randomness of the interfering sequence enables interference suppression in the channel estimation process by filtering or averaging the estimates. Configuration of this initialization has not been decided.

Enhanced Control Signaling for Heterogeneous Networks

The same enhanced control region (see for example FIG. 5) can be used in different transmission points within a cell or belonging to different cells, that are not highly interfering with each other. Such inter-deployment-layer interference may be reduced by various interference coordination techniques such as enhanced Inter-cell interference coordination (eICIC), or by Coordinated Multi Point (CoMP) operation introduced in LTE Rel-11.

To increase the UE pick-up area of a low-power node (i.e., the area in which a UE would connect a pico node or pico base station rather than a high power macro node or macro base station), cell range expansion (CRE) can be a powerful tool where a UE is prevented from making a handover to the macro layer (i.e., switching communications from a pico base station to a macro base station) unless the received power from the macro base station exceeds the received low-power node by a configured CRE margin. This effectively increases the "coverage area" of a low-power node. However, for UEs in the so-called cell-range expansion area (i.e., the area where UEs connect to the low-power node, but the macro node is received with a stronger power), it may be useful/essential that macro node reduces/minimizes the interfering signals in the subframes where the network communicates with these UEs.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

According to some embodiments, a method of operating a base station in a radio access network may include configuring first and second control channel sets with respective first and second antenna port (AP) configurations for a wireless terminal using control channel signaling transmitted to the wireless terminal. First reference signals may be transmitted to the wireless terminal according to the first antenna port configuration, and second reference signals may be transmitted to the wireless terminal according to the second antenna port configuration. For example, the first and second reference signals may be transmitted using different resource elements. In addition, a first control channel message may be transmitted to the wireless terminal using the first control channel set, and a second control channel message may be transmitted to the wireless terminal using the second control channel set.

By configuring control channel sets for reference signals as discussed above, for example, interference with reference signals may be reduced and/or channel estimation may be improved when multiple control channel sets are configured with overlapping radio resources.

The first and second reference signals may be first and second De-Modulation Reference Signals (DMRSs), the control signaling may be Radio Resource Control (RRC) signaling, and/or the first and second control channel sets may be respective first and second enhanced control channel sets, such as respective first and second Enhanced Physical Downlink Control Channel (EPDCCH) sets.

Configuring the first control channel set may include configuring a first distributed control channel set with the first antenna port configuration defining a first pair of antenna ports, and configuring the second control channel set may include configuring a second distributed control channel set with the second antenna port configuration defining a second pair of antenna ports different than the first pair of antenna ports. In addition, the first and second distributed control channel sets may overlap.

The first pair of antenna ports may include first and second antenna ports, wherein the second pair of antenna ports include third and fourth antenna ports, and the first, second, third, and fourth antenna ports may all be different antenna ports.

The first distributed control channel set may be distributed across a first plurality of physical resource blocks, the second distributed control channel set may be distributed across a second plurality of resource blocks, and at least one resource block of the second plurality may overlap with at least one resource block of the first plurality of resource blocks.

In addition, a third distributed control channel set may be configured with the first antenna port configuration for the wireless terminal using control channel signaling transmitted to the wireless terminal, the first and third distributed control channel sets may be non-overlapping, and the second and third distributed control channel sets may be non-overlapping. Accordingly, third reference signals may be transmitted to the wireless terminal in accordance with the first antenna port configuration.

Configuring the first control channel set may include configuring a first localized control channel set with the first antenna port configuration defining a first antenna port, and configuring the second control channel set may include configuring a second localized control channel set with the second antenna port configuration defining a second antenna port different than the first antenna port. The first and second localized control channel sets may at least partially overlap, and/or the first and second localized control channel sets may use a single physical resource block pair. The first localized control channel set may use first and second control channel elements of the physical resource block (PRB) pair, and the second localized control channel set may use the first and second control channel elements of the physical resource block (PRB) pair.

According to some other embodiments, a method of operating a wireless terminal in communication with a radio access network may include configuring first and second control channel sets with respective first and second antenna port (AP) configurations for the wireless terminal responsive to control channel signaling received from the radio access network. For example, the first and second reference signals may be received using different resource elements. First reference signals may be received from the radio access network according to the first antenna port configuration, and second reference signals may be received from the radio access network according to the second antenna port configuration. In addition, a first control channel message may be received from the radio access network using the first control channel set, and a second control channel message may be received from the radio access network using the second control channel set.

The first and second reference signals may be first and second De-Modulation Reference Signals (DMRSs), the control signaling may include Radio Resource Control (RRC) signaling, and/or the first and second control channel sets may be respective first and second enhanced control channel sets, such as respective first and second Enhanced Physical Downlink Control Channel (EPDCCH) sets.

Configuring the first control channel set may include configuring a first distributed control channel set with the first antenna port configuration defining a first pair of antenna ports, and configuring the second control channel set may include configuring a second distributed control channel set with the second antenna port configuration defining a second pair of antenna ports different than the first pair of antenna ports. Moreover, the first and second distributed control channel sets may overlap.

The first pair of antenna ports may be first and second antenna ports, the second pair of antenna ports may be third and fourth antenna ports, and wherein the first, second, third, and fourth antenna ports may all be different antenna ports.

The first distributed control channel set may be distributed across a first plurality of physical resource blocks, the second distributed control channel set may be distributed across a second plurality of resource blocks, and at least one resource block of the second plurality may be overlapping with at least one resource block of the first plurality of resource blocks.

Responsive to control channel signaling received from the radio access network, a third distributed control channel set may be configured with the first antenna port configuration, wherein the first and third distributed control channel sets are non-overlapping and the second and third distributed control channel sets are non-overlapping. Third reference signals may be received from the radio access network according to the first antenna port configuration.

Configuring the first control channel set may include configuring a first localized control channel set with the first antenna port configuration defining a first antenna port, and configuring the second control channel set may include configuring a second localized control channel set with the second antenna port configuration defining a second antenna port different than the first antenna port.

The first and second localized control channel sets at least partially overlap, and/or the first and second localized control channel sets may use a single physical resource block pair. Moreover, the first localized control channel set may use first and second control channel elements of the physical resource block (PRB) pair, and the second localized control channel set may use the first and second control channel elements of the physical resource block (PRB) pair.

BRIEF DESCRIPTION OF THE DRAWINGS

The accompanying drawings, which are included to provide a further understanding of the disclosure and are incorporated in a constitute a part of this application, illustrate certain non-limiting embodiment(s) of inventive concepts. In the drawings:

FIGS. 17 and 18 are flow charts respectively illustrating base station and wireless terminal operations according to some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Embodiments disclosed herein may provide, for example, methods, structures/devices, and/or means to coordinate interference between the DMRS transmitted on interfering radio resources from different nodes or between same nodes in a MU-MIMO (Multi-User MIMO) manner. Embodiments disclosed herein may also provide solutions to transmit multiple EPDCCH messages on the same radio resources from the same node, using orthogonal DMRS ports.

First Embodiments

Figure 1:
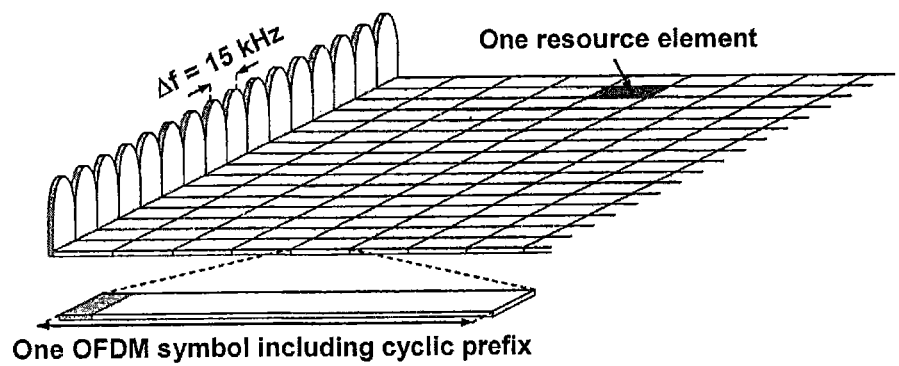
FIG. 1 is a diagram illustrating a Long Term Evolution (LTE) downlink physical resource block.
Figure 2:
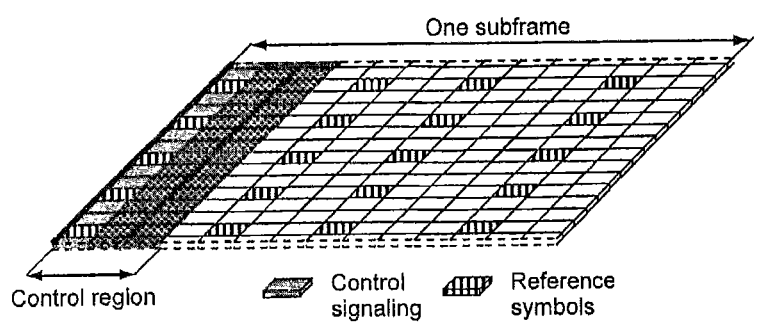
FIG. 2 is a diagram illustrating an LTE downlink subframe.
Figure 3:
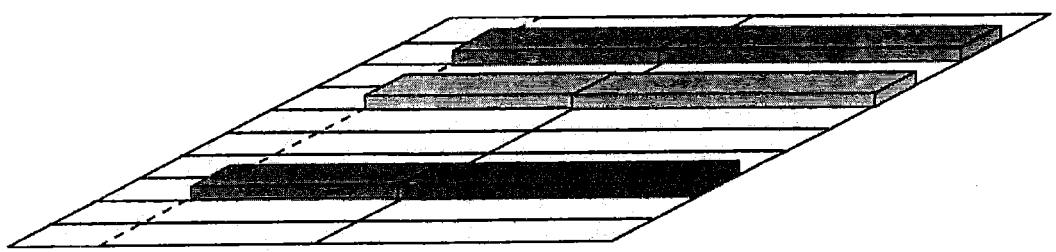
FIG. 3 is a diagram illustrating a downlink subframe with 10 RB pairs and configuration of three EPDCCH regions (i.e., bottom, middle, and upper more darkly shaded regions) having a size of one PRB pair each, wherein the remaining PRB pairs can be used for PDSCH transmission.
Figure 4:
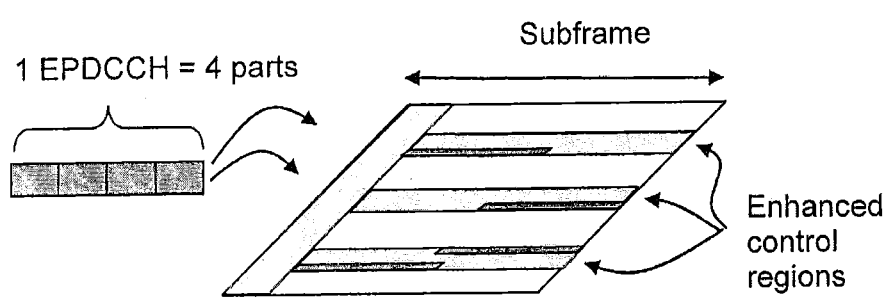
FIG. 4 is a diagram illustrating a downlink subframe with 4 parts (enhanced resource element groups or eREGs) belonging to an EPDCCH that is mapped to multiple of the enhanced control regions (known as PRB pairs) to provide distributed transmission and frequency diversity.
Figure 5:
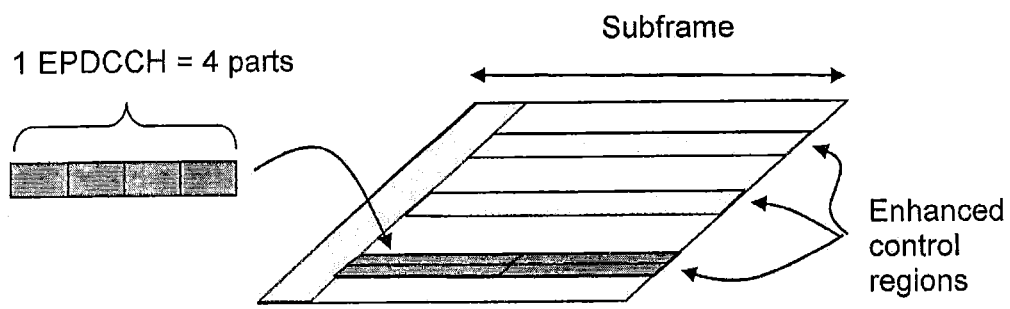
FIG. 5 is a diagram illustrating a downlink subframe with four eCCEs belonging to an EPDCCH mapped to one of the enhanced control regions to provide localized transmission.
Figure 6:
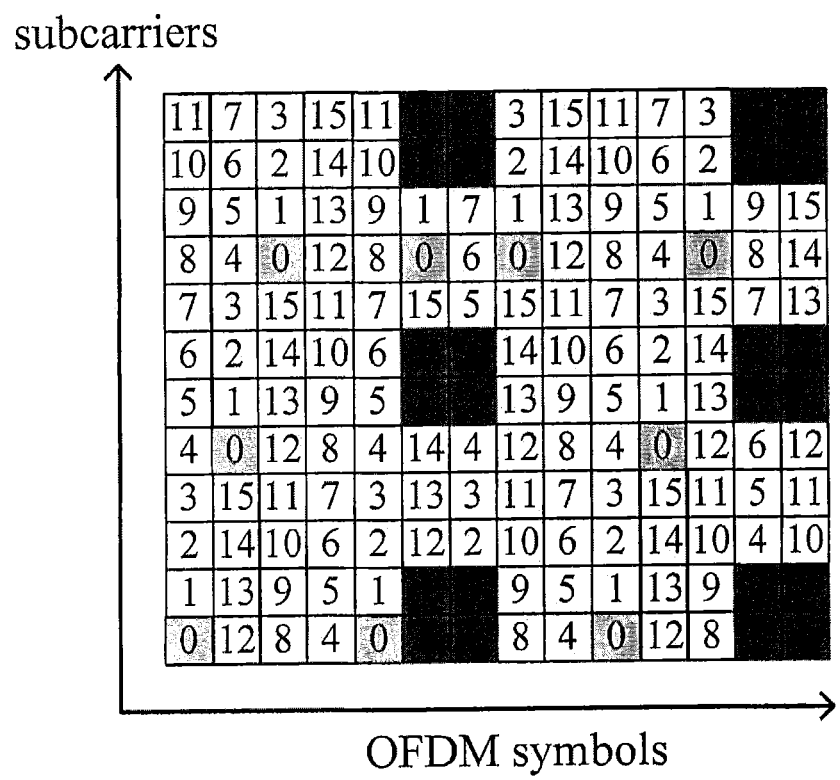
FIG. 6 is a diagram illustrating a PRB pair of normal cyclic prefix configuration in a normal subframe, where each tile is a resource element having a number corresponding to the eREG it is grouped within, and where Res with lighter shading correspond to REs belonging to the same eREG indexed with 0.
Figure 7:
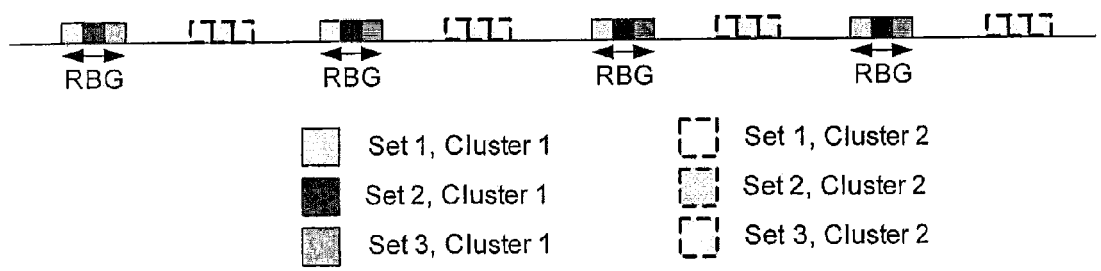
FIG. 7 is a diagram illustrating a definition of sets and clusters where the number of sets equals the RBG size. The number of RBGs per cluster in the example of FIG. 7 is set to four which corresponds to four PRB pairs per set, and a distributed EPDCCH transmission is mapped within one set.
Figure 8:
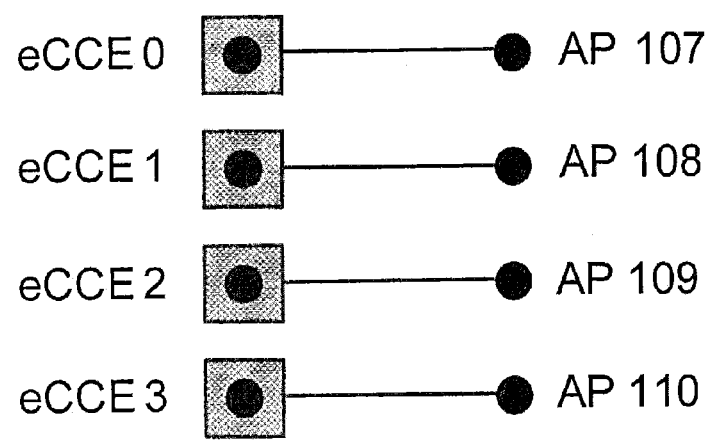
FIG. 8 is a diagram illustrating an example of eCCE and DMRS port association for a PRB pair within a localized EPDDCH set.
Figure 9:
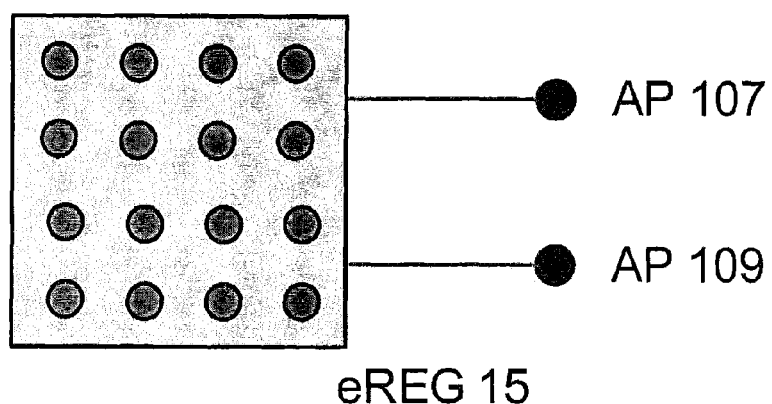
FIG. 9 is a diagram illustrating an example of antenna port associations for a PRB pair within a distributed EPDCCH set.
Figure 10:
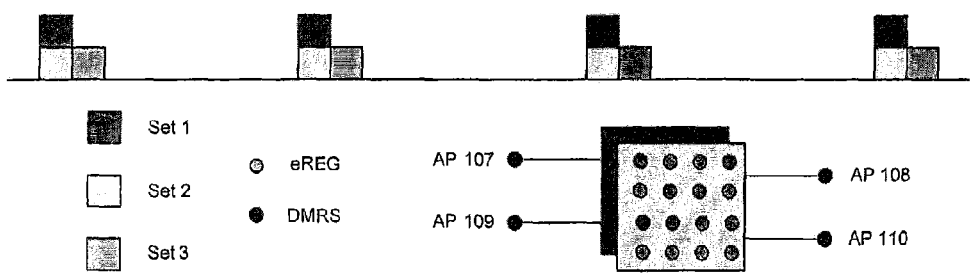
FIG. 10 is a diagram illustrating two sets configured to overlap with different pairs of DMRS ports configured for each set to improve channel estimation.

Each distributed EPDCCH set is individually configured by RRC (Radio Resource Control) signaling to the UE or wireless terminal, with a pair of DMRS ports to use for demodulation of its search space candidates. By configuring orthogonal DMRS in overlapping sets, channel estimation performance may be improved. In FIG. 10, for example, both Set 1 and Set 2 are configured with the same and overlapping PRB pairs, but Set 1 is configured with AP 107+109 while Set 2 is configured with AP 108+110 to be used as a demodulation reference(s). Hence, orthogonal reference signals are provided despite the fact that the sets are overlapping, which may improve channel estimation performance and may enable use of multi-layer transmission of EPDCCH. In this example with three sets in total, Set 3 may be configured with any AP (antenna port) pair selected from the four ports without channel estimation degradation since it is not overlapping with any other EPDCCH set.

FIG. 10 illustrates an example of two sets configured to overlap. As shown, different pairs of DMRS may be configured in each set to improve channel estimation.

Second Embodiments

Figure 11:
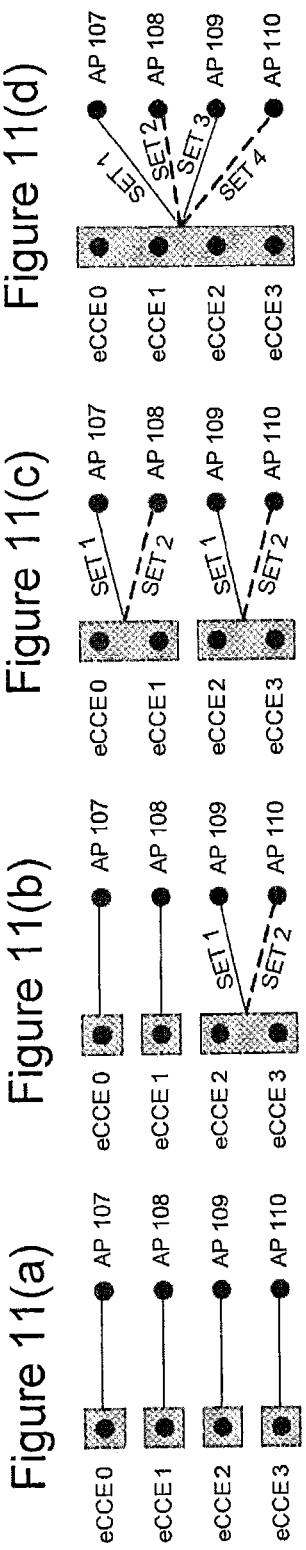
FIGS. 11(a), 11(b), 11(c), and 11(d) are diagrams illustrating examples of localized EPDCCH candidates in a PRB pair and associations to a DMRS (De-Modulation Reference Signal) port(s), with each PRB pair having 4 eCCEs (enhanced Control Channel Elements) and 4 APs (antenna ports)

Each localized EPDCCH set is individually configured with UE (wireless terminal) specific RRC signaling with an antenna port to use for demodulation in case of antenna port selection ambiguity as shown by way of example in FIGS. 11(a), 11(b), 11(c), and 11(d). In FIG. 11(a), when each EPDCCH candidate occupies only one eCCE, the DMRS association is determined by specification (eCCE to AP mapping rule). In FIG. 11(b), one EPDCCH candidate occupies two eCCEs (aggregation level 2), and one of the two possible APs (there two APs associated by eCCE to AP mapping rule) may/must be selected by eNB when performing transmission and by UE when performing demodulation. In this embodiment, the selection of which AP to use in case of ambiguity depends on the EPDCCH set. The selection is configured by higher layers to the UE (e.g. RRC, per EPDCCH set) or the set dependent selection is done implicitly, for example, by the EPDCCH set ID, or index, or set order number.

By making the selection depend on the EPDCCH set, MU-MIMO (Multi-User Multiple Input Multiple Output) of EPDCCH messages may be allowed in different sets by using orthogonal DMRS if two overlapping EPDCCH transmissions belonging to two different EPDCCH sets are selecting different APs in case of ambiguity. Other examples are shown in FIGS. 11(c) and 11(d). In FIG. 11(c), two AL=2 transmissions are illustrated, and in FIG. 11(d) AL=4 is shown. In this case there are 4 possible AP candidates and one has to be chosen. By configuring different DMRS ports in overlapping sets, channel estimation for MU-MIMO may be improved.

FIGS. 11(a), 11(b), 11(c), and 11(d) illustrate examples of localized EPDCCH candidates in a PRB pair and their associations to a DMRS. Each PRB pair has 4 eCCEs and 4 APs.

Third Embodiments

According to third embodiments, interference between reference signals of overlapping EPDCCH sets may be reduced/solved by configuring the DMRS scrambling sequence initialization independently per EPDCCH set. The configuration could be explicit by higher layer signaling (e.g., UE specific RRC configuration), or implicit (e.g., by EPDCCH set ID, set index, or set order index). Hence, different EPDCCH sets have different scrambling sequences which can be obtained by different scrambling initializations. This may reduce/solve the problem of not being able to suppress interference in the channel estimation process, between overlapping EPDCCH sets configured with non-orthogonal DMRS. With different scrambling sequences, the DMRS may become quasi-orthogonal and may then be suppressed in the channel estimation process.

System Diagrams

Figure 12:
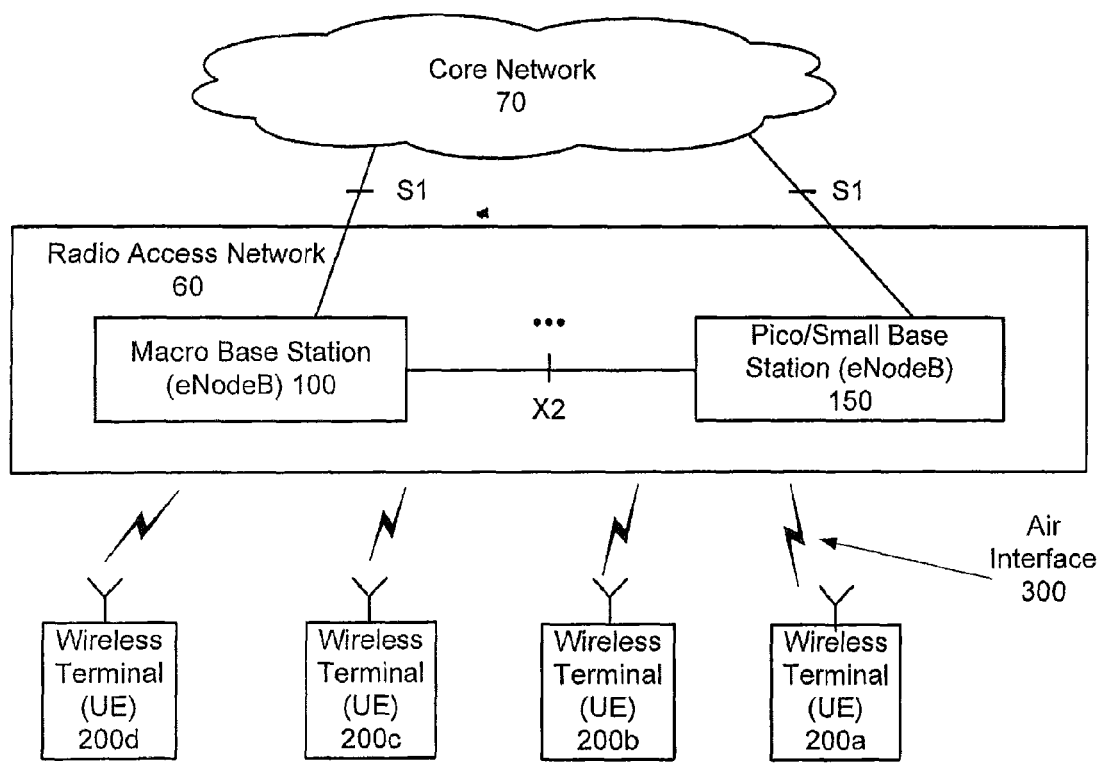
FIG. 12 is a block diagram illustrating elements of a radio communications network according to some embodiments.
Figure 14:
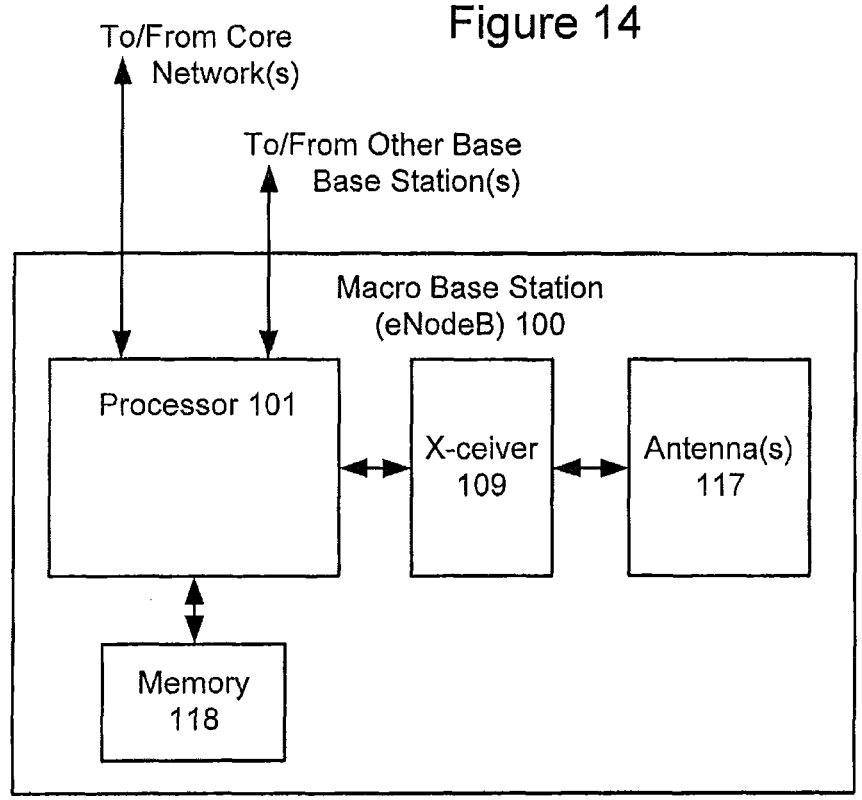
Figure 15:
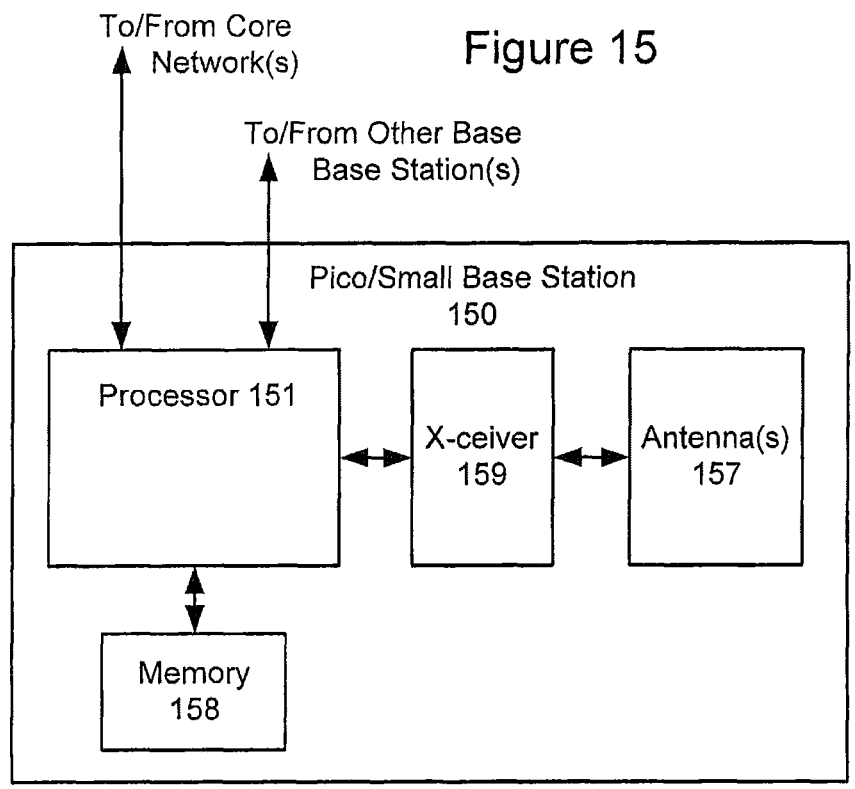
Figure 16:
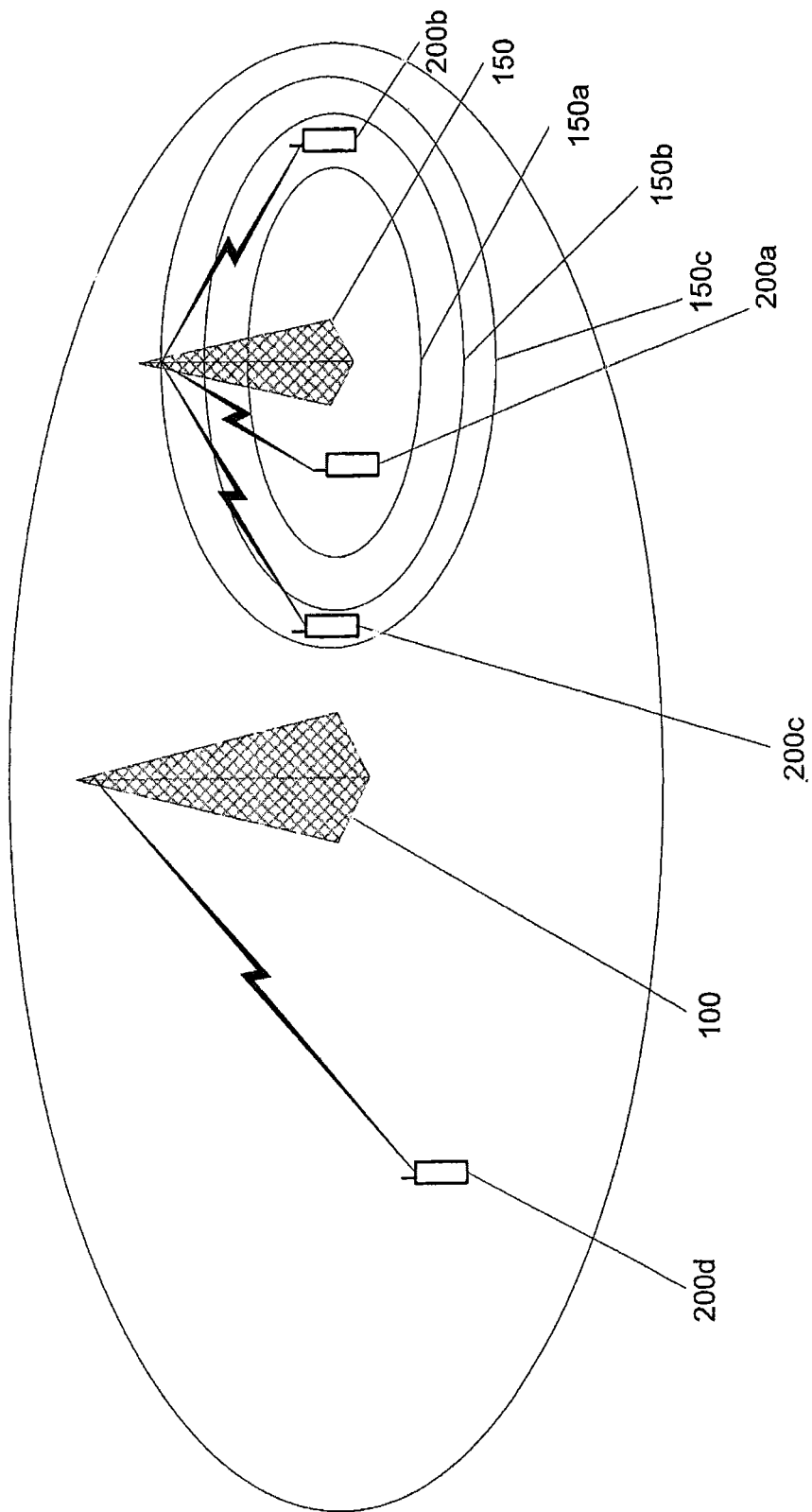
FIG. 16 is a schematic diagram illustrating base stations and wireless terminals of FIG. 12.

FIGS. 12-16 are block/schematic diagrams illustrating networks, base stations, and/or wireless terminals in which embodiments of present inventive concepts may be implemented. As shown in FIGS. 12 and 16, a radio access network 60 may include a macro base station 100 and a pico base station 150 providing service for wireless terminals 200 in respective coverage areas (cells) thereof. As shown, pico base station 150 may provide service (uplink/downlink communications) over a relatively small coverage area within a larger coverage area of macro base station 100. Moreover, macro and pico base stations 100 and 150 may support pico cell-range extension area/areas 150b/150c beyond pico cell area 150a.

Figure 13:
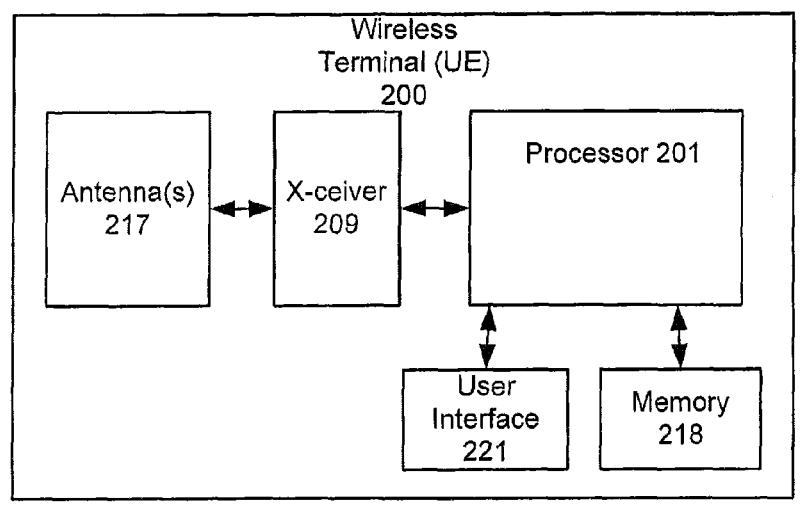
FIGS. 13, 14, and 15 are block diagrams respectively illustrating wireless terminals, macro base stations, and pico/small base stations according to some embodiments.

As shown in FIG. 13, each wireless terminal 200, for example, may include processor 201, transceiver 209, antenna(s) 217, memory 218, and user interface 221. Operations of wireless terminal 200 may be performed by processor 201 operating in accordance with computer program instructions stored in memory 218, and communicating with radio access network 60 through transceiver 209 and antenna(s) 217. By providing a plurality of antennas 217 (e.g., an antenna array), wireless terminal 200 may support multiple-input-multiple-output (MIMO) communications allowing diversity gain and/or spatial multiplexing for communications (e.g., downlink communications) between radio access network 60 and wireless terminal 200.

As shown in FIG. 14, macro base station 100 may include processor 101, transceiver 109, antenna(s) 117, and memory 118. Operations of macro base station 100 may be performed by processor 101 operating in accordance with computer program instructions stored in memory 118, and communicating with wireless terminals through transceiver 109 and antenna(s) 117. By providing a plurality of antennas 117 (e.g., an antenna array), macro base station 100 may support multiple-input-multiple-output (MIMO) communications allowing diversity gain and/or spatial multiplexing for communications (e.g., downlink communications) between radio access network 60 and wireless terminals.

As shown in FIG. 15, pico base station 150 may include processor 151, transceiver 159, antenna(s) 157, and memory 158. Operations of pico base station 150 may be performed by processor 151 operating in accordance with computer program instructions stored in memory 158, and communicating with wireless terminals through transceiver 159 and antenna(s) 157. By providing a plurality of antennas 157 (e.g., an antenna array), macro base station 150 may support multiple-input-multiple-output (MIMO) communications allowing diversity gain and/or spatial multiplexing for communications (e.g., downlink communications) between radio access network 60 and wireless terminals.

As further shown in FIG. 12, communications between macro and pico base stations 100 and 150 may be supported over X2 and/or S1 interface/interfaces. Moreover, communications between core network 70 and macro/pico base stations may be provided over S1 interfaces.

Flow Charts

FIG. 17 is a flow chart illustrating operations of base station 100 in radio access network 60 communicating with a wireless terminal 200. At block 1701, processor 101 of base station 100 configures first and second control channel sets (Set 1 and Set 2) with respective first and second antenna port (AP) configurations for a wireless terminal 200 using control channel signaling (e.g., Radio Resource Control or RRC Signaling) transmitted through transceiver 109 and antenna(s) 117 over air interface 300 to the wireless terminal 200. The first and second control channel sets (Set 1 and Set 2) may be first and second enhanced control channel sets such as first and second Enhanced Physical Downlink Control Channel (EPDCCH) sets.

At block 1703, processor 101 may transmit first reference signals (e.g., first De-Modulation Reference Signals or first DMRS) through transceiver 109 and antenna(s) 117 to wireless terminal 200 according to the first antenna port configuration, and processor 101 may transmit second reference signals (e.g., second De-Modulation Reference Signals or second DMRS) through transceiver 109 and antenna(s) 117 to wireless terminal 200 according to the second antenna port configuration. More particularly, the first and second reference signals may be transmitted using different resource elements.

At block 1705, processor 101 may transmit a first control channel message through transceiver 109 and antenna(s) 117 to wireless terminal 200 using the first control channel set, and processor 101 may transmit a second control channel message through transceiver 109 and antenna(s) 117 to wireless terminal 200 using the second control channel set.

Configuring the first control channel set at block 1701 may include configuring a first distributed control channel set (Set 1) with the first antenna port configuration defining a first pair of antenna ports, and configuring the second control channel set may include configuring a second distributed control channel set (Set 2) with the second antenna port configuration defining a second pair of antenna ports different than the first pair of antenna ports. According to some embodiments, the first and second distributed control channel sets (Set 1 and Set 2) may overlap.

The first pair of antenna ports, for example, may include first and second antenna ports AP 107 and AP 109, and the second pair of antenna ports may include third and fourth antenna ports AP 108 and AP 110, with the first, second, third, and fourth antenna ports all being different antenna ports.

The first distributed control channel set (Set 1) may be distributed across a first plurality of physical resource blocks, and the second distributed control channel set (Set 2) may be distributed across a second plurality of resource blocks, wherein at least one resource block of the second plurality is overlapping with at least one resource block of the first plurality of resource blocks.

In addition, operations of block 1701 may include configuring a third distributed control channel set (Set 3) with the first antenna port configuration for the wireless terminal 200 using control channel signaling transmitted through transceiver 109 and antenna(s) 117 to the wireless terminal 200, wherein the first and third distributed control channel sets (Set 1 and Set 3) are non-overlapping and the second and third distributed control channel sets (Set 2 and Set 3) are non-overlapping. At block 1703, third reference signals may be transmitted through transceiver 109 and antenna(s) 117 to wireless terminal 200 according to the first antenna port configuration.

At block 1701, configuring the first control channel set (Set 1) may include configuring a first localized control channel set with the first antenna port configuration defining a first antenna port, and configuring the second control channel set (Set 2) may include configuring a second localized control channel set with the second antenna port configuration defining a second antenna port different than the first antenna port. Moreover, the first and second localized control channel sets (Set 1 and Set 2) may at least partially overlap, and/or the first and second localized control channel sets (Set 1 and Set 2) may use a single physical resource block pair.

The first localized control channel set (Set 1) may use first and second control channel elements eCCE0 and eCCE1 of the physical resource block PRB pair, and the second localized control channel set (Set 2) may use the first and second control channel elements eCCE0 and eCCE1 of the physical resource block PRB pair.

FIG. 18 is a flow chart illustrating operations of wireless terminal 200 communicating with base station 100 in radio access network 60. At block 1801, processor 201 may configure first and second control channel sets (Set 1 and Set 2) with respective first and second antenna port (AP) configurations for wireless terminal 200 responsive to control channel signaling (e.g., Radio Resource Control signaling or RRC signaling) received from the radio access network 60 (as discussed above with respect to block 1701) through antenna(s) 217 and transceiver 209. The first and second control channel sets (Set 1 and Set 2) may be first and second enhanced control channel sets such as first and second Enhanced Physical Downlink Control Channel (EPDCCH) sets.

At block 1803, processor 201 may receive first reference signals from the radio access network 60 through antenna(s) 217 and transceiver 209 according to the first antenna port configuration, and processor 201 may receive second reference signals from the radio access network 60 through antenna(s) 217 and transceiver 209 according to the second antenna port configuration. The first and second reference signals may be received using different resource elements, and/or the first and second reference signals may be first and second De-Modulation Reference Signals (DMRSs).

At block 1805, processor 201 may receive a first control channel message from the radio access network 60 using the first control channel set, and the processor 201 may receive a second control channel message from the radio access network 60 using the second control channel set.

At block 1801, configuring the first control channel set may include configuring a first distributed control channel set (Set 1) with the first antenna port configuration defining a first pair of antenna ports, and configuring the second control channel set may include configuring a second distributed control channel set (Set 2) with the second antenna port configuration defining a second pair of antenna ports different than the first pair of antenna ports. According to some embodiments, the first and second distributed control channel sets (Set 1 and Set 2) may overlap.

The first pair of antenna ports may include first and second antenna ports AP 107 and AP 109, the second pair of antenna ports may include third and fourth antenna ports AP 108 and AP 110, and the first, second, third, and fourth antenna ports may all be different antenna ports.

The first distributed control channel set (Set 1) may be distributed across a first plurality of physical resource blocks, and the second distributed control channel set (Set 2) may be distributed across a second plurality of resource blocks wherein at least one resource block of the second plurality is overlapping with at least one resource block of the first plurality of resource blocks.

In addition, block 1801 may include configuring a third distributed control channel set (Set 3) with the first antenna port configuration responsive to control channel signaling received from the radio access network 60 through antenna 217 and transceiver 209, wherein the first and third distributed control channel sets (Set 1 and Set 3) are non-overlapping and the second and third distributed control channel sets (Set 2 and Set 3) are non-overlapping. At block 1803, third reference signals may be received from the radio access network 60 through antenna 217 and transceiver 209 according to the first antenna port configuration.

At block 1801, configuring the first control channel set (Set 1) may include configuring a first localized control channel set with the first antenna port configuration defining a first antenna port, and configuring the second control channel set (Set 2) may include configuring a second localized control channel set with the second antenna port configuration defining a second antenna port different than the first antenna port. According to some embodiments, the first and second localized control channel sets (Set 1 and Set 2) may at least partially overlap.

Moreover, the first and second localized control channel sets (Set 1 and Set 2) may use a single physical resource block pair.

The first local control channel set (Set 1) may use first and second control channel elements eCCE0 and eCCE1 of the physical resource block (PRB) pair, and the second localized control channel set (Set 2) may use the first and second control channel elements eCCE0 and eCCE1 of the physical resource block (PRB) pair.

Advantages of Some Embodiments

Embodiments discussed herein may thus provide methods, structures, and/or means to improve channel estimation when multiple EPDCCH sets are configured with overlapping radio resources such as PRB pairs. Embodiments discussed herein may also reduce/solve problems with DMRS ambiguity when a localized EPDCCH message contains multiple aggregated eCCEs, while providing a methods to utilize MU-MIMO with demodulation based on orthogonal DMRS for those EPDCCH messages.

Abbreviations

UE User Equipment
RS Reference Symbols
RB Resource Block
PRB Physical Resource Block
AP Antenna Port
AL Aggregation Level
CCE Control Channel Element
eNB evolved Node B
RBG Resource Block Group
REG Resource Element Group
eREG extended REG
eCCE enhanced CCE
CRE Cell-Range expansion
eICIC enhanced Inter-Cell Interference Coordination
fICIC frequency domain Inter-Cell Interference Coordination
CoMP Coordinated Multi Point
RRC Radio Resource Control
MIMO Multiple Input Multiple Output
MU-MIMO Multi-User MIMO
DMRS De-Modulation Reference Signal
PDCCH Physical Downlink Control Channel
EPDCCH Enhanced PDCCH
PDSCH Physical Downlink Shared Channel
RE Resource Element
RNTI Radio-Network Temporary Identifier
3GPP $3^{rd}$ Generation Partnership Project
LTE Long Term Evolution Further Definitions When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of present inventive concepts will be or become apparent to one with skill in the art upon review of the present drawings and description. It is intended that all such additional network elements, devices, and/or methods be included within this description, and be within the scope of present inventive concepts. Moreover, it is intended that all embodiments disclosed herein can be implemented separately or combined in any way and/or combination.

That which is claimed is:

1. A method of operating a base station in a radio access network, the method comprising:
   configuring first and second control channel sets with respective first and second antenna port (AP) configurations for a wireless terminal using control channel signaling transmitted to the wireless terminal, wherein configuring the first control channel set comprises configuring a first distributed control channel set with the first antenna port configuration, wherein configuring the second control channel set comprises configuring a second distributed control channel set with the second antenna port configuration different than the first antenna port configuration, wherein the first antenna port configuration defines first and second antenna ports, wherein the second antenna port configuration defines third and fourth antenna ports, and wherein the first, second, third, and fourth antenna ports are all different antenna ports;
   transmitting first reference signals to the wireless terminal according to the first antenna port configuration; and
   transmitting second reference signals to the wireless terminal according to the second antenna port configuration.

2. The method according to claim 1, wherein the first and second distributed control channel sets overlap.

3. The method according to claim 1, wherein the first distributed control channel set is distributed across a first plurality of physical resource blocks, and wherein the second distributed control channel set is distributed across a second plurality of resource blocks wherein at least one resource block of the second plurality is overlapping with at least one resource block of the first plurality of resource blocks.

4. The method according to claim 1 further comprising:
   configuring a third distributed control channel set with the first antenna port configuration for the wireless terminal using control channel signaling transmitted to the wireless terminal, wherein the first and third distributed control channel sets are non-overlapping, and wherein the second and third distributed control channel sets are non-overlapping; and
   transmitting third reference signals to the wireless terminal according to the first antenna port configuration.

5. The method according to claim 1 wherein the first and second reference signals are transmitted to the wireless terminal using different resource elements according to the respective first and second antenna port (AP) configurations, wherein the first and second antenna port (AP) configurations are different.

6. The method according to claim 1 wherein configuring the first control channel set comprises configuring a first localized control channel set with the first antenna port configuration defining a first antenna port, and wherein configuring the second control channel set comprises configuring a second localized control channel set with the second antenna port configuration defining a second antenna port different than the first antenna port.

7. The method according to claim 6 wherein the first and second localized control channel sets at least partially overlap.

8. The method according to claim 6 wherein the first and second localized control channel sets use a single physical resource block pair.

9. The method according to claim 8 wherein the first localized control channel set uses first and second control channel elements of the physical resource block (PRB) pair and wherein the second localized control channel set uses the first and second control channel elements of the PRB pair.

10. The method according to claim 1 further comprising:
    transmitting a first control channel message to the wireless terminal using the first control channel set; and
    transmitting a second control channel message to the wireless terminal using the second control channel set.

11. The method according to claim 1 wherein the first and second reference signals are first and second De-Modulation Reference Signals (DMRS).

12. The method according to claim 1 wherein the control signaling comprises Radio Resource Control (RRC) signaling.

13. The method according to claim 1 wherein the first and second control channel sets comprise respective first and second enhanced control channel sets.

14. The method according to claim 1 wherein the first and second control channel sets comprise first and second Enhanced Physical Downlink Control Channel (EPDCCH) sets.

15. A method of operating a wireless terminal in communication with a radio access network, the method comprising:
    responsive to control channel signaling received from the radio access network, configuring first and second control channel sets with respective first and second antenna port (AP) configurations for the wireless terminal, wherein configuring the first control channel set comprises configuring a first distributed control channel set with the first antenna port configuration, wherein configuring the second control channel set comprises configuring a second distributed control channel set with the second antenna port configuration different than the first antenna port configuration, wherein the first antenna port configuration defines first and second antenna ports, wherein the second antenna port configuration defines third and fourth antenna ports, and wherein the first, second, third, and fourth antenna ports are all different antenna ports;

receiving first reference signals from the radio access network according to the first antenna port configuration; and receiving second reference signals from the radio access network according to the second antenna port configuration.

16. The method according to claim 15, wherein the first and second distributed control channel sets overlap.

17. The method according to claim 15 wherein the first and second reference signals are received by the wireless terminal using different resource elements according to the respective first and second antenna port (AP) configurations, wherein the first and second antenna port (AP) configurations are different.

18. The method according to claim 15 wherein configuring the first control channel set comprises configuring a first localized control channel set with the first antenna port configuration defining a first antenna port, and wherein configuring the second control channel set comprises configuring a second localized control channel set with the second antenna port configuration defining a second antenna port different than the first antenna port.

* * * * *